H. JOHNSON.
SAW SET.
APPLICATION FILED APR. 19, 1911.
1,054,124.
Patented Feb. 25, 1913.
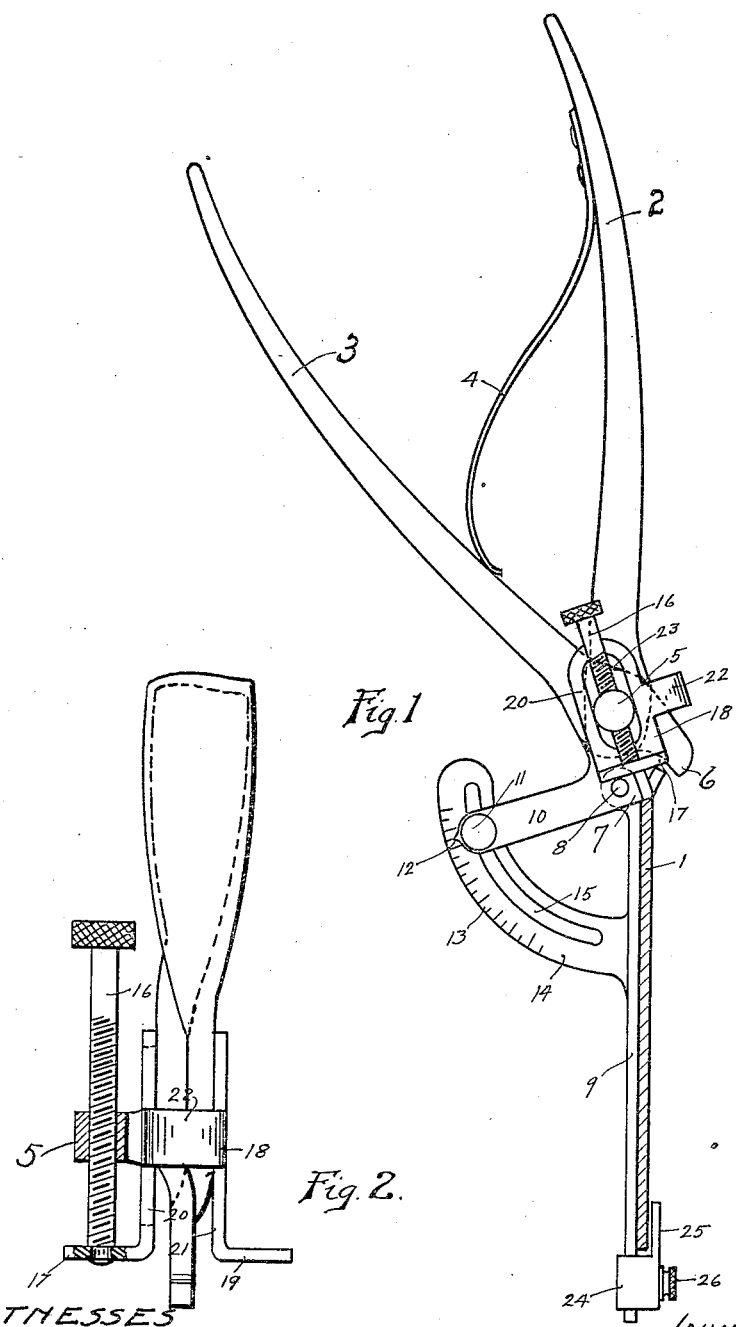

UNITED STATES PATENT OFFICE.

HGELMER JOHNSON, OF ELK, WASHINGTON.

SAW-SET.

1,054,124.   Specification of Letters Patent.   Patented Feb. 25, 1913.

Application filed April 19, 1911. Serial No. 622,041.

*To all whom it may concern:*

Be it known that I, HGELMER JOHNSON, a citizen of the United States, residing at Elk, in the county of Spokane and State of Washington, have invented certain new and useful Improvements in Saw-Sets; and I do hereby declare the following to be a full, clear, and exact description of the invention, such as will enable others skilled in the art to which it appertains to make and use the same.

This invention relates to improvements in saw sets, and has for an object the arrangement of improved means for adjusting a device, whereby when the device is operated the teeth of the saw will be set at any desired angle.

Another object of the invention is the arrangement of an improved means for setting a saw, associated with a guide for holding the same properly in position for acting upon the various teeth as the device is forced over the saw.

A still further object of the invention is the arrangement in a saw set, of a sliding gage for engaging the teeth, and a pivotally adjustable arm for controlling the angle of the bend or set of the teeth, the same being associated with a scale for indicating exactly the angle to which the tooth may be bent.

With these and other objects in view the invention comprises certain novel constructions, combinations, and arrangement of parts as will be hereinafter more fully described and claimed.

In the accompanying drawings: Figure 1 is a side view of the device shown in position. Fig. 2 is an enlarged detail edge view of an adjusting member.

In constructing a gage embodying the invention a pair of clamping or pinching members are provided for engaging the teeth of a saw, and bending the same as desired. To one of these clamping members is arranged an arm designed to rest against the flat side of a saw and to carry an adjustable stop which engages the lower edge of the saw so as to limit the upward movement of the set as the same is moved from one tooth to another. Associated with the arm is a gage designed to indicate the angle at which the pinching member proper will operate. An adjustable member is provided and slidingly mounted on the pinching member for regulating the length of bend of the respective teeth.

In order that the invention may be more clearly understood an embodiment of the same is shown in the accompanying drawings in which—

1 indicates a saw of any desired kind to which the device is applied.

The device is provided with a pair of gripping members or handles 2 and 3 normally held separated by a suitable spring 4. These members are pivotally connected by a pivotal member 5 the same being crossed so as to form jaw portions 6 and 7 designed to be brought together or toward each other as members 2 and 3 are pressed together. If the members 2 and 3 were permitted free movement the gripping faces or jaw portions 6 and 7 would act similar to an ordinary pair of pliers, but in order to properly cause the same to engage and bend the teeth of a saw member 2 is pivotally mounted at 8 to an upright or stay member 9. Member 2 is also provided with a projection 10, preferably formed integral therewith, which is provided with an aperture at its outer end through which clamping bolt or thumb member 11 passes. Projection 10 is also formed with a pointing projecting portion 12 which indicates on the scale 13 the angle at which the device is designed to operate, scale 13 being formed on a slotted arc shaped member 14 which member is integrally formed with stay member 9 or rigidly secured thereto. Bolt 11 passes through the slot 15 in member 14, and is arranged to firmly clamp the end of projection 10 to member 14 at any desired point so as to rigidly hold member 2 against movement independent of stay member 9, and saw 1. However, member 2 and jaw portion 7 are permitted free pivotal movement around the pivotal rivet or retaining member 5.

Member 5 projects beyond the surface of gripping members 2 and 3, and has a threaded aperture formed therein for accommodating thumb screw 16. Thumb screw 16 is designed to pass through an upturned portion 17 on the adjustable stop 18 and have the end thereof upset so as to prevent the removal of the thumb member. However, the end of thumb screw 16 is not riveted or upset sufficiently to prevent rotary movement of the thumb screw 16, but, on the contrary, permits a free rotary movement of thumb screw 16, but prevents any longitudinal movement thereof independent of stop 18. By this arrangement stop 18 may be moved toward and from the teeth of the saw for limiting the amount of engagement of the jaw portions 6 and 7 with the teeth of a saw. If the teeth of a saw are large the stop 18 will be moved toward pivotal member 5 so as to bend the full length of the tooth when setting the saw, but if the teeth of the saw are small the stop 18 will be moved away from pivotal member 5 until the lower corner or edge of jaw portion 6 is at approximately the juncture of the teeth of the saw so as to only bend the teeth and not any part of the saw. In fact the stop or gage 18 is adjusted for each saw in this manner so that the jaw portions will engage the teeth for substantially the full length of the teeth, and bend the teeth at the juncture of the same with the saw. In order to permit a proper operation of the stop 18 the same is made with upturned portions or feet 17 and 19 which are designed to rest against the teeth of the saw on each side of the jaw portions. In order to do this the stop is made with side members 20 and 21 having a bowed central portion 22 for causing the side members to act in unison. Side member 20 is provided with a slot 23 for accommodating pivotal member 5 and permit a free reciprocation of the stop 18.

In order to hold the jaw portions 6 and 7, and associated parts, in their correct position the stay member 9 is formed sufficiently long to permit the same to extend beyond the lower end of the saw 1, and carries at its lower end a stop 24 having a flange 25 and a set screw 26. The flange 25 is designed to be positioned on the opposite side of saw 1 to the depending member 9, while the body portion of the stop 24 is positioned a short distance below the lower edge of the saw in order to permit a slight up and down movement of the gripping jaws as the same are moved from one tooth to another along the saw. After the device has been placed upon a saw the same is moved across the saw and operated on each alternate tooth or on any desired teeth as the device is moved. After the teeth on one side of the saw have been set the device is moved to the opposite side of the saw and the operation repeated for setting the opposite teeth.

What I claim is:

1. In a device of the character described, a stay member arranged to be positioned alongside of a saw, means for holding the lower end of said stay member against said saw, a pivotally mounted lever structure connected with the upper end of said stay member, said lever structure being designed to engage the teeth of said saw for bending the same, an arm rigidly connected to one of the members of said lever structure, an arm extending from said supporting stay, and a clamping member for clamping said arms together at any desired point along said last mentioned arm for adjusting said plier structure.

2. In a saw set, a supporting stay member, a pivotally mounted lever structure pivotally connected with said stay member, said pivotally mounted lever structure being formed with a jaw portion and a handle portion, a coacting member pivotally connected with said first mentioned lever structure formed with a handle portion and jaw portion for coacting with the jaw portion of said first mentioned lever structure and moved toward the same when said handles are moved toward each other, an arm for holding said first mentioned lever structure normally rigid in respect to said stay member, and a clamping member for holding said last mentioned means against movement, whereby the angle of the operation of said jaw portions is regulated.

3. In a saw set, a plier structure formed with the pivotal pin extending laterally therefrom, said pivotal pin being formed with a threaded aperture therein, a substantially U-shaped guide spanning said pliers, said guide being formed with feet extending at right angles to the general direction of said plier structure for fitting on the upper surface of saws operated on by said plier structure, and a threaded bolt structure pivotally mounted in one of said feet and extending through said threaded aperture in said pivotal pin, whereby said guide may be adjusted.

In testimony whereof I affix my signature in presence of two witnesses.

HGELMER JOHNSON.

Witnesses:
J. H. HANNON,
CLAUDE M. SMITH.

---

Copies of this patent may be obtained for five cents each, by addressing the "Commissioner of Patents, Washington, D. C."